United States Patent [19]

Shimada

[11] Patent Number: 5,541,641
[45] Date of Patent: Jul. 30, 1996

[54] STEREOSCOPIC IMAGE DISPLAY

[75] Inventor: Satoshi Shimada, Kanagawa, Japan

[73] Assignee: Sony Corporation, Tokyo, Japan

[21] Appl. No.: 296,923

[22] Filed: Aug. 31, 1994

[30] Foreign Application Priority Data

Aug. 31, 1993 [JP] Japan .................... 5-239174

[51] Int. Cl.$^6$ .................... H04N 7/18
[52] U.S. Cl. .................... 348/58; 348/53
[58] Field of Search .................... 348/58, 53, 51, 348/42, 57, 46, 47, 52; H04N 13/00

[56] References Cited

U.S. PATENT DOCUMENTS

| | | | |
|---|---|---|---|
| 4,582,393 | 4/1986 | Shieman | 348/42 |
| 4,588,259 | 5/1986 | Sheiman | 348/51 |
| 4,740,836 | 4/1988 | Craig | 348/42 |

Primary Examiner—Tommy P. Chin
Assistant Examiner—A. Au
Attorney, Agent, or Firm—Jay H. Maioli

[57] ABSTRACT

In glasses for viewing stereoscopic images on a stereoscopic image display for displaying stereoscopic images by dividing a predetermined display screen into two to display a first and a second image which are viewed from different points on the divided display, a stereoscopic image can be observed without a sense of discomfort. Glasses for viewing stereoscopic images can be constructed which allow people to observe a stereoscopic image with less of a sense of discomfort by providing a sight-limitation frame for the right eye that allows only the right screen to be observed and a sight-limitation frame for the left eye that allows only the left screen to be observed.

7 Claims, 19 Drawing Sheets

STEREOSCOPIC IMAGE DISPLAY

BACKGROUND OF THE INVENTION

Field of the Invention

This invention relates to a pair of glasses for viewing stereoscopic images, and more particularly, to glasses adapted to be used for a stereoscopic image display for displaying a stereoscopic image with a high-definition television set.

Conventionally, a display which has the construction shown in FIG. 1 is available as a stereoscopic image display for displaying a stereoscopic image. In FIG. 1, numeral 1 shows an overall construction of the stereoscopic image display. Double images 3A and 3B having polarizing planes orthogonal to each other are shifted by an amount corresponding to the deviation in sight between the left eye and the right eye and are displayed on a screen 2. The images on the screen 2 can be observed as a stereoscopic image when the double images 3A and 3B are watched with glasses 4 for viewing a stereoscopic image having polarizing filters for the right eye and the left eye, the polarizing filters having polarizing planes in the same direction with respect to the double images 3A and 3B.

However, the stereoscopic image display 1 having such a design has the problem of giving a sense of discomfort to a viewer who watches the double images 3A and 3B but who does not wear glasses 4 for viewing a stereoscopic image because the double images 3A and 3B shifted by a predetermined amount are displayed on the screen 2.

Furthermore, the stereoscopic image display 1 having the above design has the problem of poor usability because, when a viewer tries to watch a stereoscopic image with glasses 4 for viewing a stereoscopic image, the perimeter of the screen 2 comes into sight, causing the viewer to feel uncomfortable when watching the perimeter of the screen.

In view of the foregoing, an object of this invention is to provide glasses for viewing stereoscopic images with which a viewer can watch the stereoscopic image with less of a sense of discomfort.

To solve the above problems, this invention provides glasses for viewing stereoscopic images 30 for use in a stereoscopic image display 10 for displaying a stereoscopic image G by dividing a predetermined display screen 22A into two and displaying a first and a second images R, and L, respectively on the divided display sections 22R and 22L, the glasses comprising a first sight-limitation frame 110A which allows only the first image R to reach the first eye and a second sight-limitation frame 110B which allows only the second image L to reach the second eye of the person viewing the display screen.

Also, to solve the above problems, this invention provides a stereoscopic image display for displaying a stereoscopic image G by displaying, on a predetermined screen 22A, two images R and L which are viewed from different points, the display comprising: display means 22 for displaying an image L to be seen with the left eye on the left half 22L of a display screen 22A having an aspect ratio larger than a standard television set, and an image R to be seen with the right eye on the right half 22R of a display screen; and optical means 55 and 56 for overlapping, in the center of the display screen, the image on the left half 22L of the display screen 22A and the image on said right half 22R of the display screen so that the images reach the left eye and the right eye, respectively.

The stereoscopic image display of this invention further comprises a pair of polarizing filters 23A and 23B arranged on the left half 22L and the right half 22R of the display screen 22A, and having polarizing properties which render the pair of polarizing filters non-transparent to light; and a pair of polarizing filters 53 and 54 arranged on optical means 55 and 56, and having polarizing properties corresponding to the pair of polarizing filters 23A and 23B.

Furthermore, this invention provides a stereoscopic image display for displaying a stereoscopic image G by displaying on a predetermined screen 22A, two images R and L which are viewed from different points, the display comprising: display means 22 for displaying an image L to be seen with the left eye on said left half 22L of the display screen 22A having an aspect ratio larger than a standard television set, and an image R to be seen with the right eye on the right half 22R of the display screen 22A; a pair of polarizing filters 23A and 23B arranged on the left half 22L and the right half 22R of the display screen 22A, and having polarizing properties which render the pair of polarizing filters 23A and 23B non-transparent to light; and a pair of polarizing filters 53 and 54 arranged before the left and right eyes of a person who sees the display screen 22A, and having polarizing properties corresponding to the pair of polarizing filters 23A and 23B.

Still furthermore, this invention provides a stereoscopic image display for displaying a stereoscopic image G by displaying, on a predetermined screen 22A, two images R and L which are viewed from different points, the display comprising: display means 17 and 22 for displaying, by reversing time relationships between an image R to be seen with the right eye and an image L to be observed with the left eye, the image R to be seen with the right eye on the left half 22L of the display screen 22A having an aspect ratio larger than a standard television set, and the image L to be seen with the left eye on the right half 22R of the display screen 22A.

The stereoscopic image display of this invention also comprises optical means 51 and 52 arranged before the left and right eyes of a person who watches the display screen 22A, the optical means 51 and 52 overlapping, in the center of the display screen 22A, the image on the left half 22L and the image on the right half 22R of the display screen 22A so that the images reach the left and right eyes.

The stereoscopic image display of this invention also comprises: a pair of polarizing filters 23A and 23B arranged on the left half 22L and the right half 22R of the display screen 22A, and having polarizing properties which render the pair of polarizing filters 23A and 23B non-transparent to light; and a pair of polarizing filters 33 and 34 arranged before the left and right eyes of a person who sees said display screen 22A, and having polarizing properties corresponding to the pair of polarizing filters 23A and 23B.

The stereoscopic image display of this invention also comprises: a pair of polarizing filters 23A and 23B arranged on the left half 22L and the right half 22R of the display screen 22A, and having polarizing properties which render the pair of polarizing filters 23A and 23B non-transparent to light; and a pair of polarizing filters 33 and 34 arranged on the optical systems 51 and 52, and having polarizing properties corresponding to the pair of polarizing filters 23A and 23B.

This invention allows a viewer to watch a stereoscopic image with less of a sense of discomfort and without seeing an unnatural image in the perimeter of the stereoscopic image G by allowing the first image R to reach the first eye with the sight-limitation frame 110A and the second image L to reach the second eye with the sight-limitation frame 110B.

This invention provides a stereoscopic image with a display image free of a sense of discomfort and more easily seen by displaying images R and L which are seen from different points on each of the display sections 22L and 22R formed by dividing a predetermined screen 22A having a large aspect ratio into two in the horizontal direction.

As described above, in accordance with this invention, glasses for viewing stereoscopic images can be constructed that enable a person to watch stereoscopic images with less of a sense of discomfort by providing a sight-limitation frame for the right eye with which only the right screen can be projected onto the area of vision and a sight-limitation frame for the left eye with which only the left screen can be projected onto the area of vision.

The nature, principles and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall construction

Figure 1:
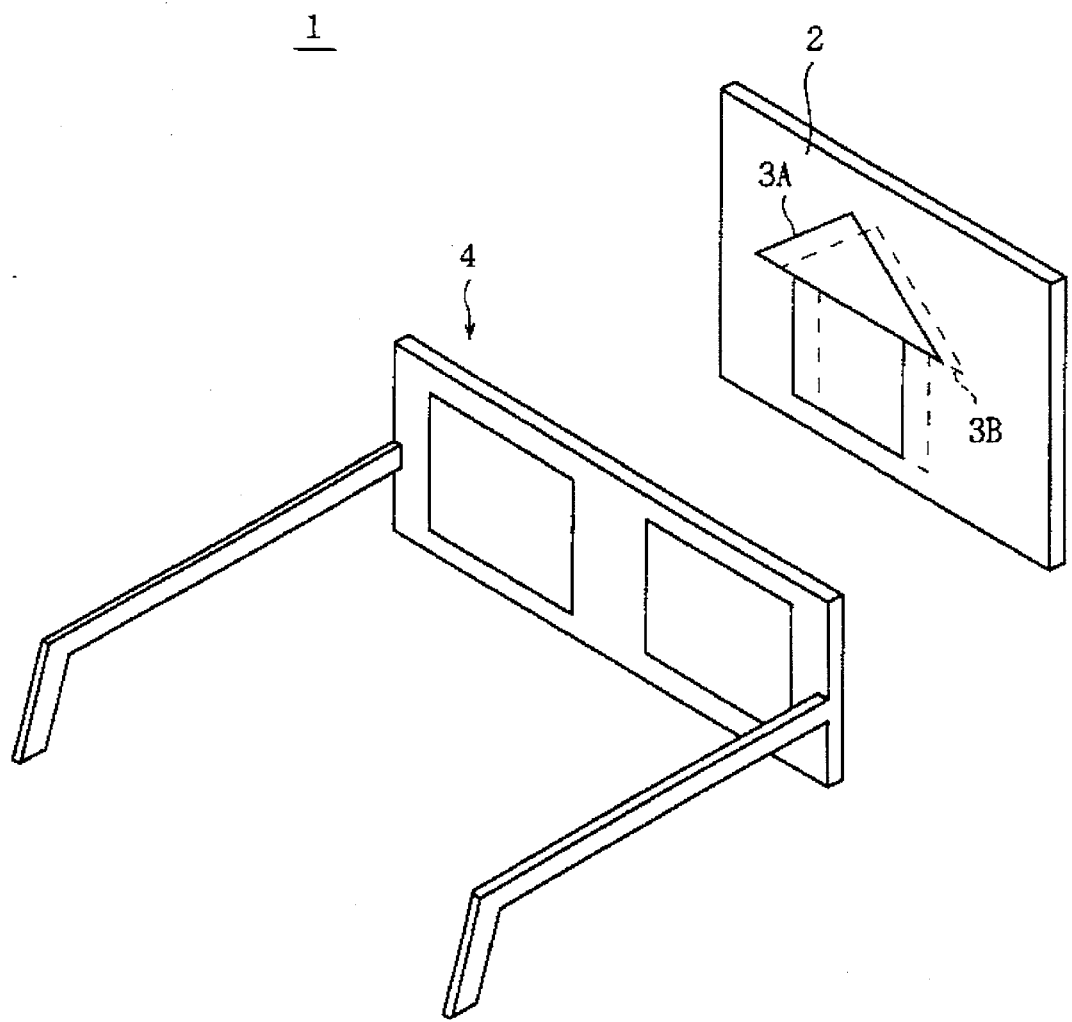
FIG. 1 is a schematic linear perspective view showing a conventional example.
Figure 2:
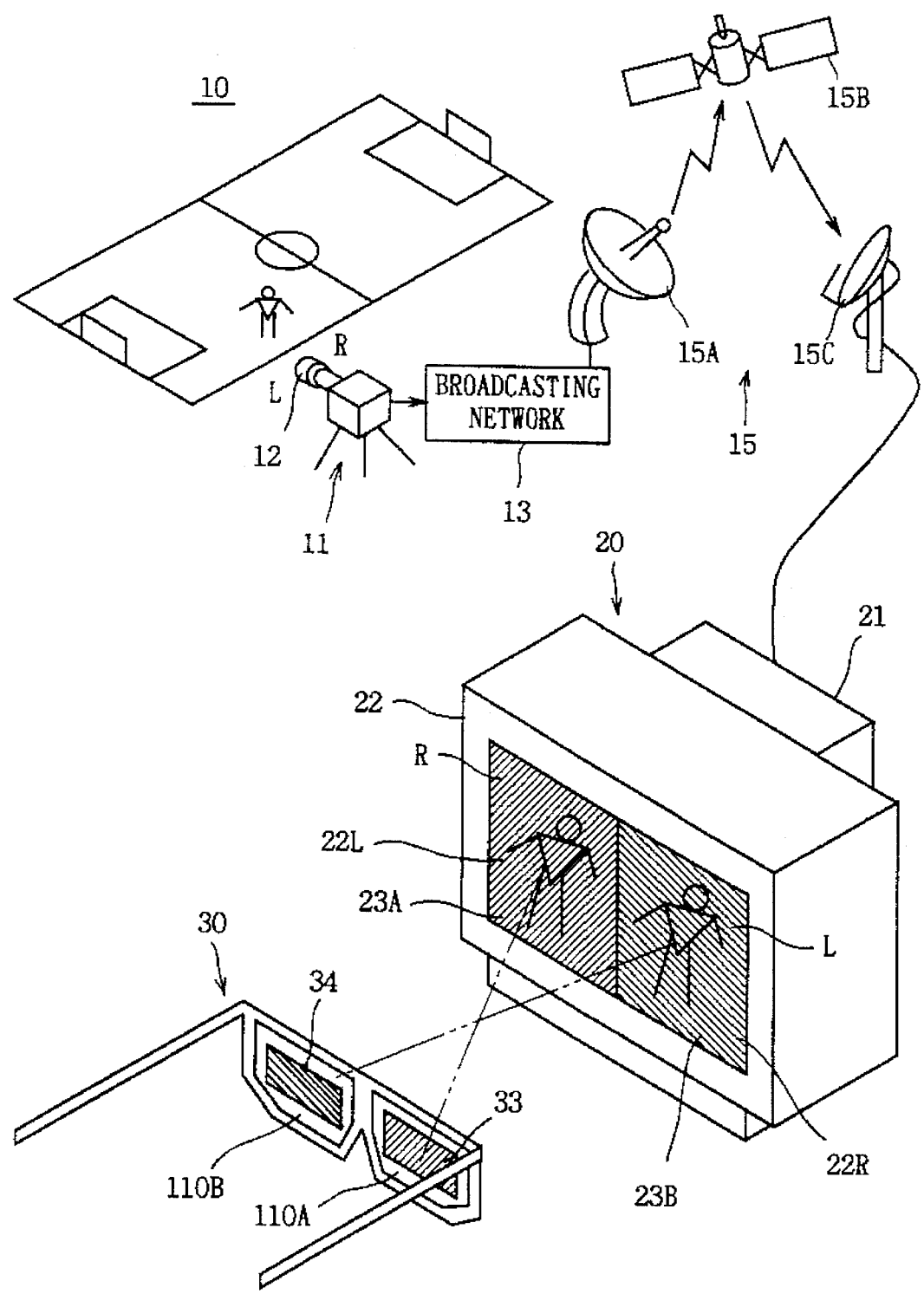
FIG. 2 is a schematic linear view showing an embodiment of a stereoscopic image system of this invention.

Referring to FIG. 2, reference numeral 10 designates a stereoscopic image display system as a whole for photographing and displaying stereoscopic images. A stereoscopic image camera 11 photographs left and right images having viewpoints shifted for the distance between the left and right eyes with a stereo adapter 12 provided on the end of the lens. The images are converted to a high-definition television MUSE mode signal and the position of the left and right images (on the left screen and the right screen) are reversed with an image-replacement circuit (described later) for replacing the position of the left and right images. After that, the images thus reversed in their positions are transmitted via a broadcasting network 13 to a transmission channel comprising a transmission antenna 15, a broadcasting satellite 15B, and a reception antenna 15C.

The tuner 21 of a receiver 20 then receives the high-definition television signal received by the reception antenna 15C. The monitor 22 displays the high-definition television signal. Consequently, the monitor 22 displays on the right side and the left side of the display screen of the monitor 22 the left screen image and the right screen image photographed by the stereoscopic image camera 11.

The entire display screen of the monitor 22 has an aspect ratio of 16:9. The right screen R is displayed on the left display screen 22L horizontally divided into two and having an aspect ratio of 8:9 whereas the left screen L is displayed on the right display screen 22R. Furthermore, on the front of the display screen of the monitor 22, polarizing filters 23A and 23B mutually non-transparent to light are arranged corresponding to the right screen R and the left screen L.

Such a display image on the monitor 22 is observed with glasses 30 for viewing a stereoscopic image. The glasses 30 for viewing a stereoscopic image are provided with a polarizing filter 33 for the right eye and a polarizing filter 34 for the left eye, the polarizing filter 33 having a polarizing direction that is the same as the polarizing filter provided on the right screen R displayed on the left side of the monitor 22, the polarizing filter 34 having a polarizing direction that is the same as the polarizing filter provided on the left screen L displayed on the right side of the monitor 22.

Consequently, the image obtained through the polarizing filter 33 for the right eye is given only on the right screen R displayed on the left half (left display screen 22L) of the display screen of the monitor 22, whereas the image obtained through the polarizing filter 34 for the left eye is given only on the left screen L displayed on the right half (right display screen 22R) of the display screen of the monitor 22. Thus, a user who watches the monitor 22 with glasses 30 for viewing stereoscopic images can observe a stereoscopic image formed by a visual synthesis of the right screen R and the left screen L in the vicinity of the center of the monitor 22 by watching the right screen R with the right eye only and the left screen L with the left eye only.

In addition, the glasses 30 for stereoscopic images are provided with a sight-limitation frame 110A on the polarizing filter 33 for the right eye and a sight-limitation frame 110B on the polarizing filter 34 for the left eye. Thus, the user can watch image light which has transmitted the polarizing filter 33 and the polarizing filter 34 through an opening surrounded by the sight-limitation frames 110A and 110B.

Figure 3:
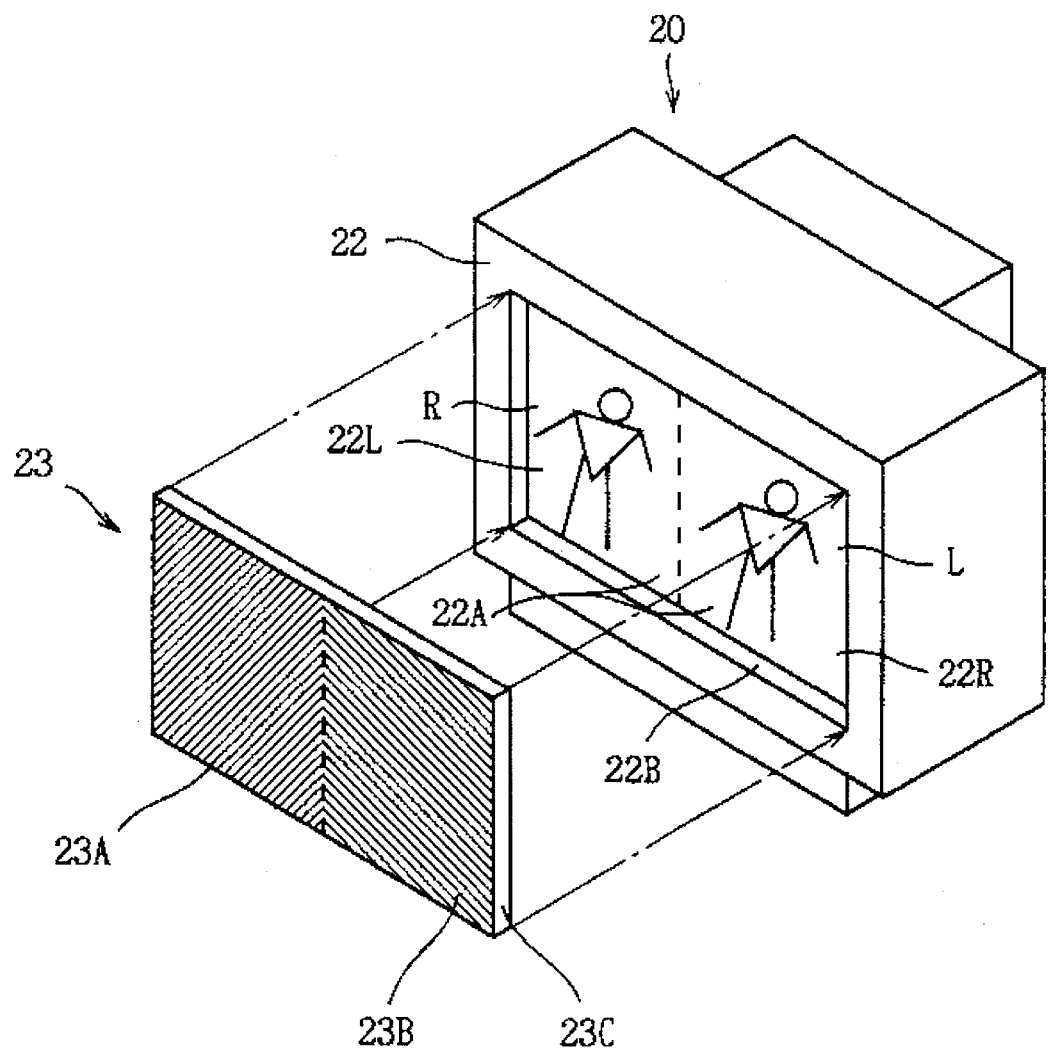
FIG. 3 is a perspective view showing the installation of the polarizing filter.

FIG. 3 shows the installation of the polarizing filter 23 in the receiver 20. The polarizing filter 23 can be installed by fitting the support frame 23C of the polarizing filter 23 into the fitting port 22B formed on the perimeter of the display screen 22A of the monitor 22.

Figure 4:
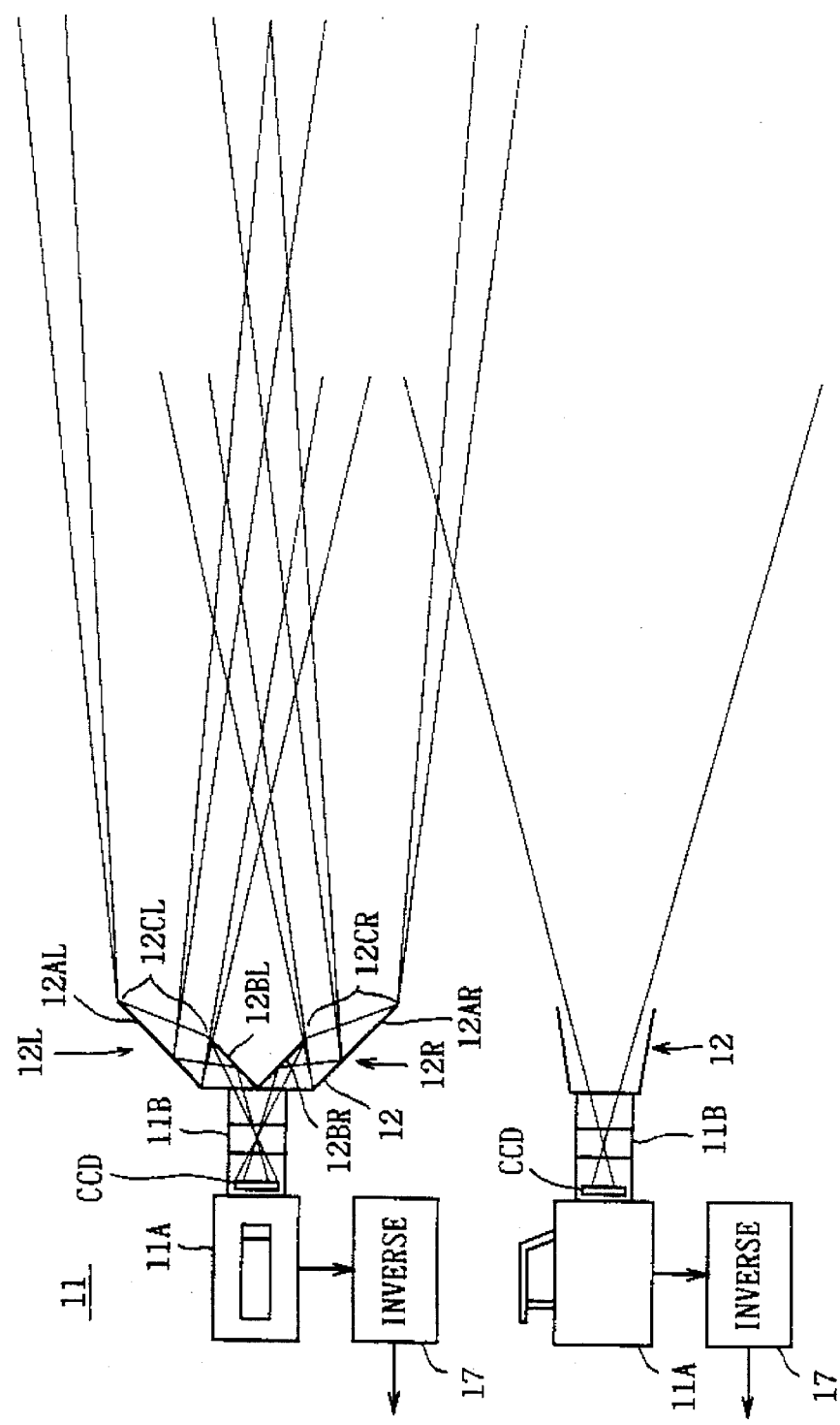
FIGS. 4A and 4B are perspective views showing a construction of a camera for stereoscopic images.

Here, FIGS. 4A and 4B shows a plan view (FIG. 4A) and a side view (FIG. 4B) of the camera 11 for stereoscopic images. The camera itself 11A has an optical system 11B at the end thereof. The stereo adapter 12 is installed on one end of the optical system 11B so that images which are viewed from different points can be introduced into the optical system 11B.

Therefore, the stereo adapter 12 comprises an optical system for the left side of the screen 12L for optically introducing the left-hand image and an optical system for the right side of the screen 12R for optically introducing the right-hand image. The left-hand optical system 12L has an inlet port for the left-hand screen 12CL and the right-hand optical system 12R has an inlet port for the right-hand screen 12CR.

The left-hand optical system 12L, on the one hand, reflects the image light coming from the inlet port 12CL of the left-hand screen with a first reflection mirror 12AL and the second reflection mirror 12BL so that the image is introduced into the optical system 11B of the camera 11 for stereoscopic images. The right-hand optical system 12R, on the other hand, reflects the image light coming from the inlet port 12CR of the right-hand screen with the first reflection mirror 12AR and the second reflection mirror 12BR so that the image can be introduced into the optical system 11B of the camera 11 for stereoscopic images.

The camera itself 11A can separately photograph left and right images by receiving the left-hand image and the right-hand image coming through the optical system 11B in a section to which the photographing element (photoelectric conversion element) CCD corresponds.

Figure 5:
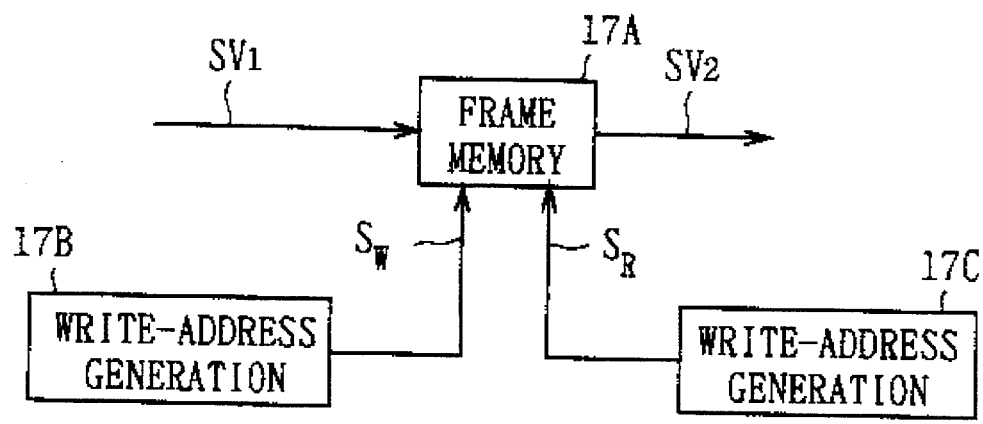
FIG. 5 is a block diagram showing a construction of an image-replacement circuit.

In addition, FIG. 5 shows an image-replacement circuit 17 for replacing the left and right position of the right screen R and the left screen L obtained by the camera 11 for stereoscopic images. After the high-definition television signal (data) $SV_1$ obtained by the camera 11 for stereoscopic images is written to frame memory 17A by one screen (one frame) with a writing address $S_W$ from a writing address generation circuit 17B, the same signal is read with a reading address signal $S_R$ which replaces the left and right positions of the arrangement of the right screen R and the left screen L (namely which replaces the time relationships in the high-definition television signal). Consequently, the high-definition television signal $SV_2$ read from frame memory 17A becomes a signal displayed by arranging the left screen L on the right side and the right screen R on the left side.

Figure 6:
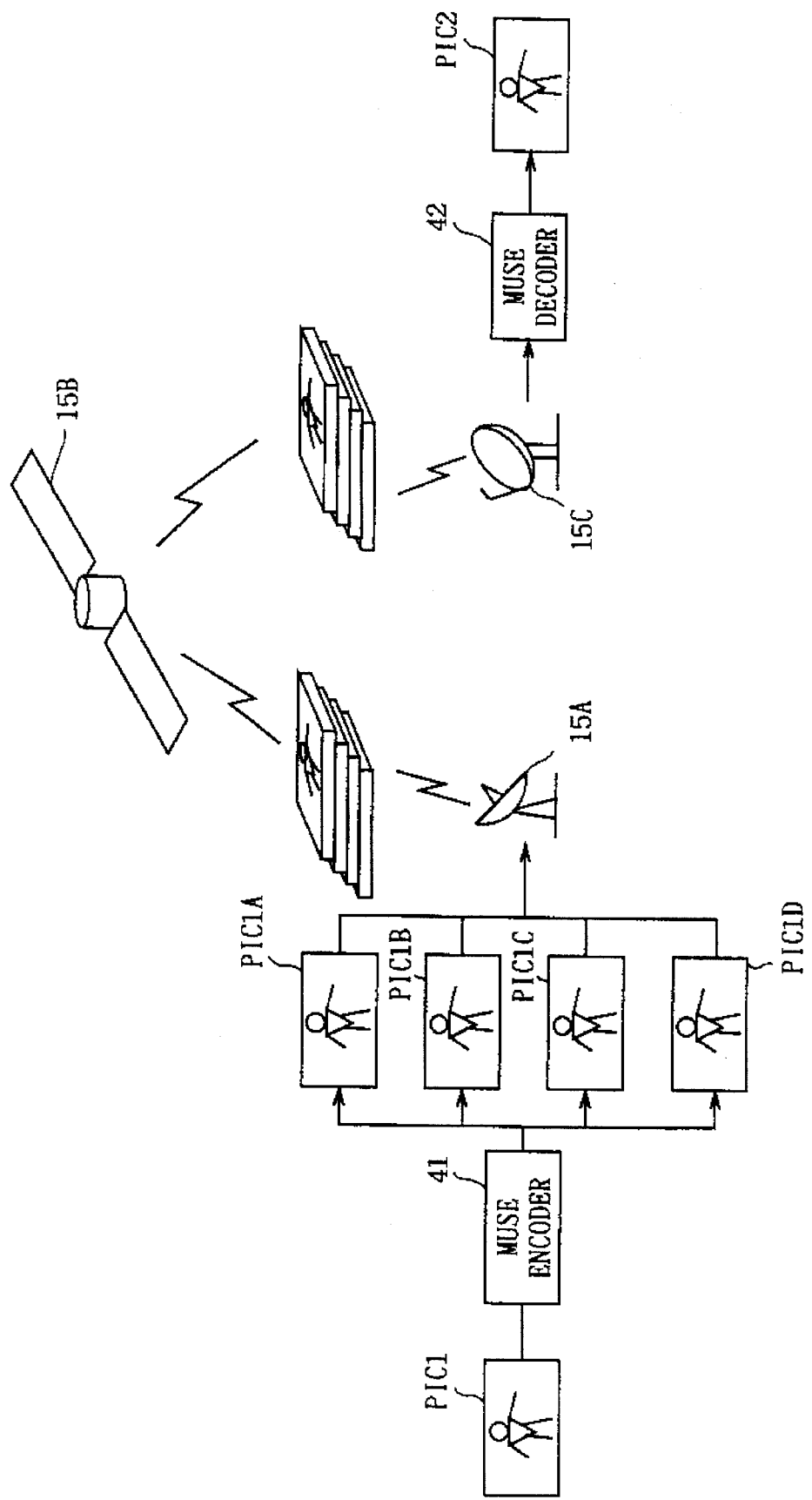
FIG. 6 is a schematic linear view showing a system for transmitting a high-definition television signal.

Here, FIG. 6 shows a transmission system of the high-definition television signal. An original high-definition image PIC1 obtained by the camera 11 for stereoscopic images is digitally processed with a MUSE decoder 41 to be divided into four parts by compressing the band of the image data in one screen (one frame), thereby providing a first divided image PIC1A to fourth divided image PIC1D which are transmitted by electromagnetic waves through a satellite via a transmission antenna 15C. The high-definition television signal received by the reception antenna 15C is input to the MUSE decoder 42 to be restored into the original single-screen image (PIC2).

Figure 7A:
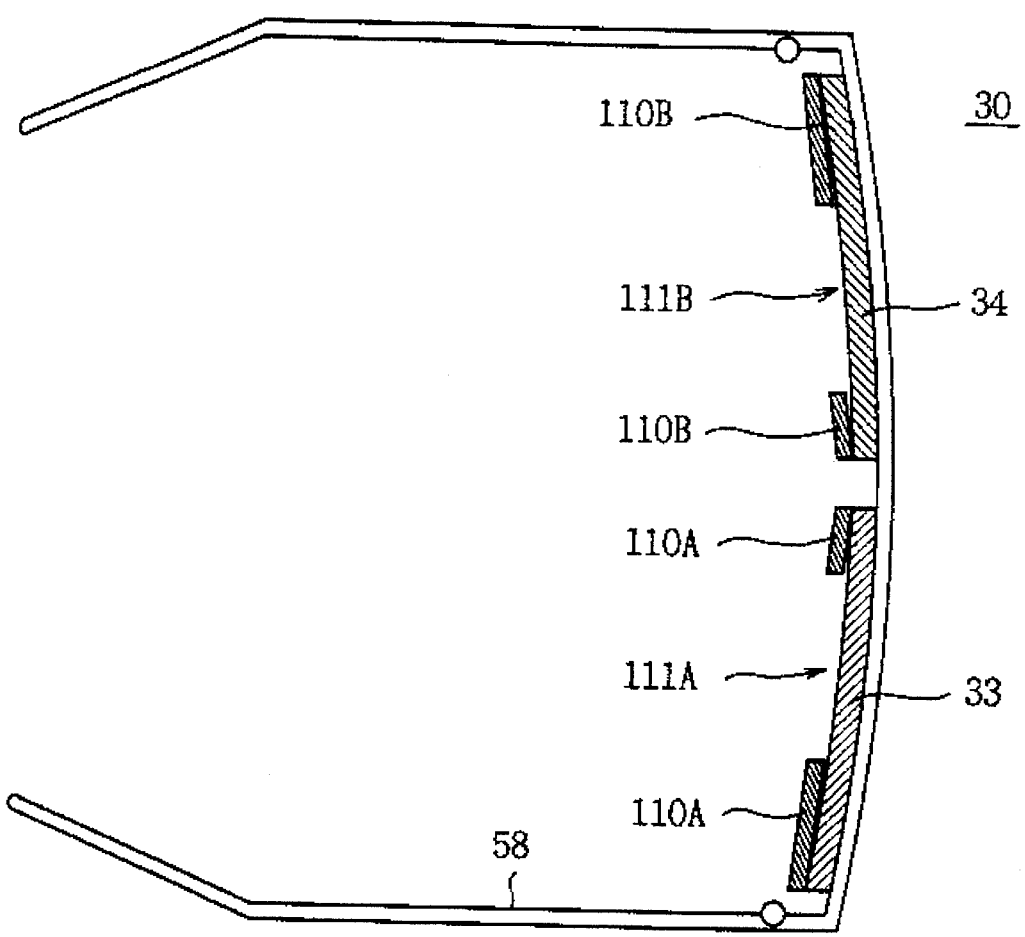
FIGS. 7A and 7B are schematic linear views showing glasses for viewing stereoscopic images of this invention.
Figure 7B:
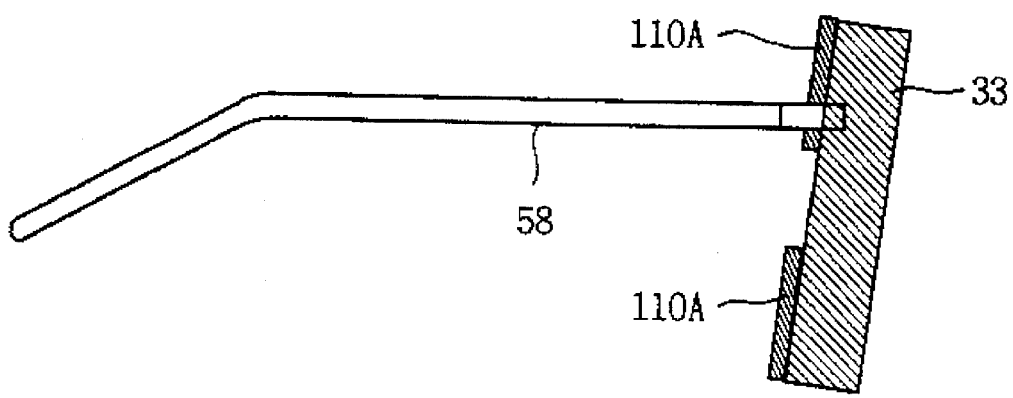

Furthermore, FIGS. 7A and 7B show construction of glasses 30 for stereoscopic images. The sight-limitation frames 110A and 110B are fixed to the polarizing filter 33 for the right eye and the polarizing filter 34 for the left eye. When the image light transmitted by the polarizing filters 33 and 34 through openings 111A and 111B surrounded by the sight-limitation frames 110A and 110B reaches the eyes of the user, only the right screen R displayed on the left half 22L of the display screen 22A reaches the right eye of the user, whereas only the left screen L displayed on the right half 22R of the display screen 22A reaches the left eye.

(2) Operation and Advantage of Embodiments

Figure 8:
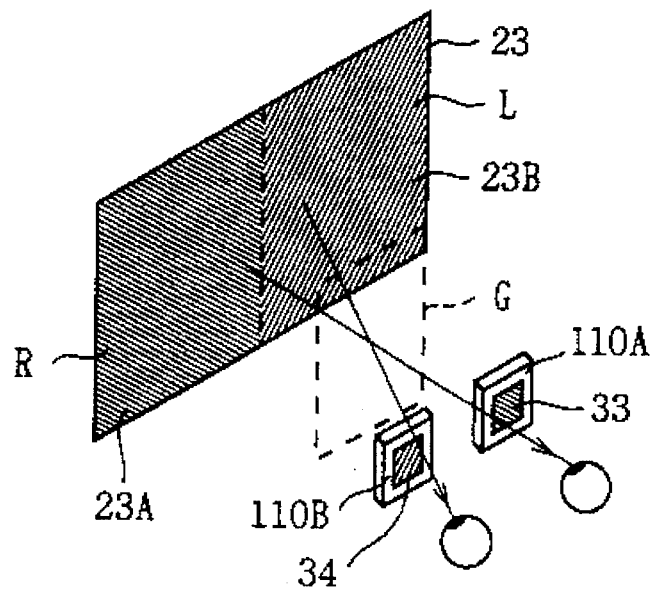
FIG. 8 is a perspective view used for explaining the principles of the embodiment.

With the stereoscopic image display system 10 having the above construction, as shown in FIG. 8, the right screen R displayed through the left side (23A) of the polarizing filter 23 installed on the monitor 22 is observed with the right eye through the polarizing filter 33 for glasses for viewing stereoscopic images, whereas the left screen L displayed through the right side (23B) of the polarizing filter 23 installed on the monitor 22 is observed with the left eye through the polarizing filter 34 for glasses for viewing stereoscopic images, with the result that the user can observe a stereoscopic image G at a position where the right screen R crosses the left screen L.

With the presence of the sight-limitation frames 110A and 110B, only the right screen R displayed on the left side 22L of the display screen 22A reaches the right eye, whereas only then left screen L displayed on the right side 22R of the display screen 22A reaches the left eye, with the result that the user can watch only the stereoscopic image G without a sense of discomfort and without seeing an unnatural image on the perimeter of the stereoscopic image G.

Therefore, in accordance with the above arrangement, the right screen R and the left screen L are separately displayed on the left display screen 22L and the right display screen 22R, respectively, on the display screen 22A of the monitor 22. Thus, compared with the conventional display of the double images, a user can watch the stereoscopic image without wearing glasses 30 for viewing stereoscopic images and without having a sense of discomfort. At the same time, a user can watch the stereoscopic image with the sense of watching a normal plane image by using glasses 30 for viewing stereoscopic images, and can view the stereoscopic image alone, without seeing an unnatural image on the perimeter of the stereoscopic image G with the sight-limitation frames 110A and 110B.

Furthermore, the embodiment of this invention can provide a stereoscopic image G having an aspect ratio of 8:9 by dividing the display screen 22A of the monitor 22 of the high-definition television mode having an aspect ratio of 16:9 into two parts in the horizontal direction to display the right screen R and the left screen L. Compared with the display of a longitudinal image obtained by dividing the monitor of the NTSC mode into two parts, the embodiment provides a sufficient aspect ratio, thereby reproducing a sufficient live sense together with a high-definition image comprising 1125 scanning lines.

Figure 9:
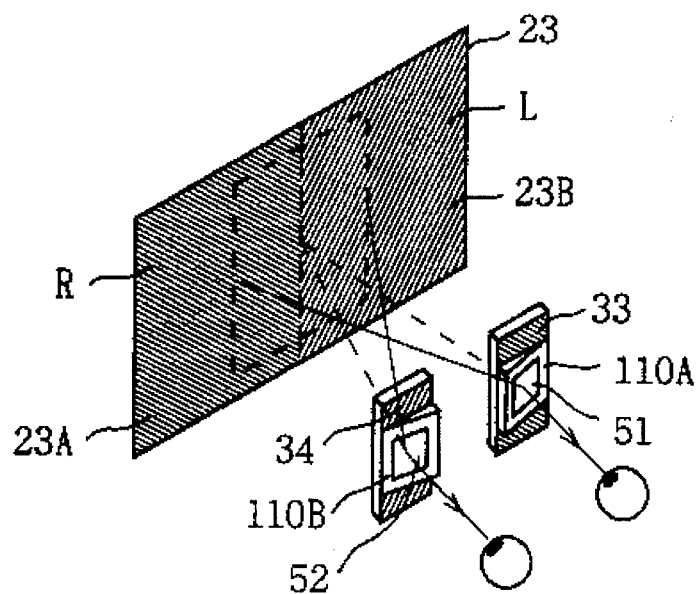
FIG. 9 is a perspective view showing an example of use of left and right replacement employing polarizing filters, and a prisms.

(3) Other Embodiments (3-1) In the above embodiment, the left and the right screens replace each other on the display screen 22A of the monitor 22 so that the right screen R displayed on the left side is watched with the right eye through the polarizing filter 33, whereas the left screen L displayed on the right side is watched with the left eye through the polarizing filter 34. However, this invention is not limited to this, for example, as shown in FIG. 9, image light coming from the right screen R and the left screen L can be converted into parallel light for observation by matching a prism 51 to the polarizing filter 33 and a prism 52 to the polarizing filter 34, with the result that a user can watch the stereoscopic image with a natural line of sight without approaching the axis of the dividing line to each other.

In such a case, the stereoscopic image can be observed without a sense of discomfort by providing the sight-limitation frames 110A and 110B on the prisms 51 and 52.

Figure 10:
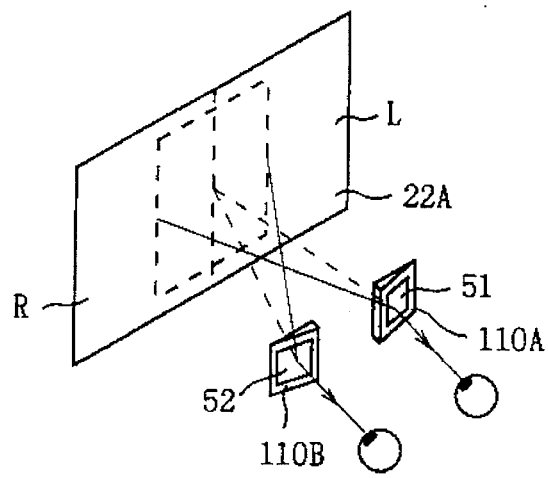
FIG. 10 is a perspective view showing an example of use of left and right replacement employing prisms.

(3-2) In the above embodiment, the left and the right screens replace each other on the display screen 22A of the monitor 22, with the result that the right screen R displayed on the left side is watched with the right eye through the polarizing filter 33 and the left screen L displayed on the right side is watched with the left eye through the polarizing filter 34. However, this invention is not limited to this, for example, as shown in FIG. 10, the stereoscopic image can be watched only with prisms 51 and 52 without providing polarizing filters 23 on the monitor 22 and polarizing filters 33 and 34 for glasses 30 for viewing stereoscopic images.

In such a case, the stereoscopic image can be watched without a sense of discomfort by providing the sight-limitation frames 110A and 110B on the prisms 51 and 52.

Figure 11:
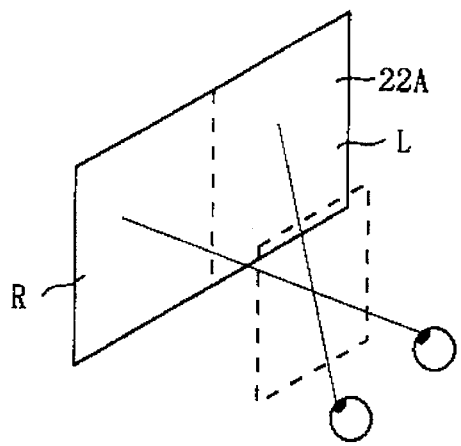
FIG. 11 is a perspective view showing an example of use of left and right replacement.

(3-3) In the above embodiments, the left and the right screens replace each other on the display screen 22A of the monitor 22, with the result that the right screen R displayed on the left side is watched with the right eye through the polarizing filter 33 and the left screen L displayed on the right side is watched with the left eye through the polarizing filter 34. However, this invention is not limited to this, for example, as shown in FIG. 11, the stereoscopic image can be obtained by directly watching an image displayed on the display screen 22A without providing the polarizing filter 23 on the monitor 22, the polarizing filters 33 and 34 for glasses 30 for viewing stereoscopic images, and prisms 51 and 52.

Figure 12:
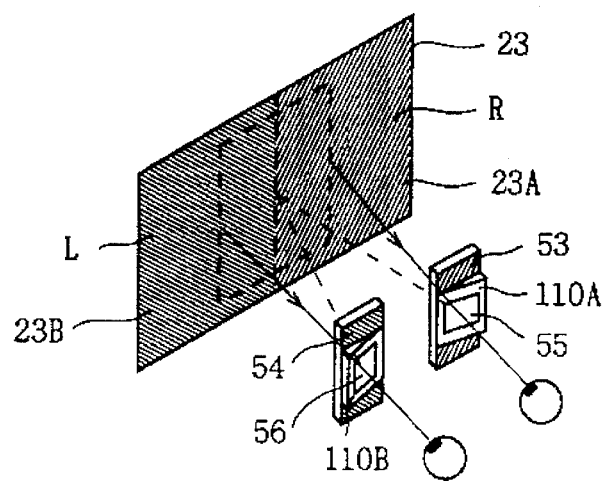
FIG. 12 is a perspective view showing an example of use of left and right parallel arrangement display employing a polarizing filters, and prisms.

(3-4) In the above embodiments, the left and the right screens replace each other on the display screen 22A of the monitor 22, with the result that the right screen R displayed on the left side is watched with the right eye through the polarizing filter 33 and the left screen L displayed on the right side is watched with the left eye through the polarizing filter 34. However, this invention is not limited to this, for example, as shown in FIG. 12, the left screen L may be displayed on the left side of the display screen 22A and the right screen R may be displayed on the right side of the display screen 22A without replacing the left and the right screens R and L with each other, with the result that the right screen R may be observed with the right eye through the polarizing filter 23A provided on the monitor 22 and the polarizing filter 53 transparent to light with respect to the polarizing filter 23A and the prism 55, whereas the left screen L may be observed with the left eye through the polarizing filter 23B provided on the monitor 22 and the polarizing filter 54 transparent to light with respect to the polarizing filter 23B and the prism 56.

In such a case, the stereoscopic image can be watched without a sense of discomfort by providing the sight-limitation frames 110A and 110B on the prisms 55 and 56.

Figure 14:
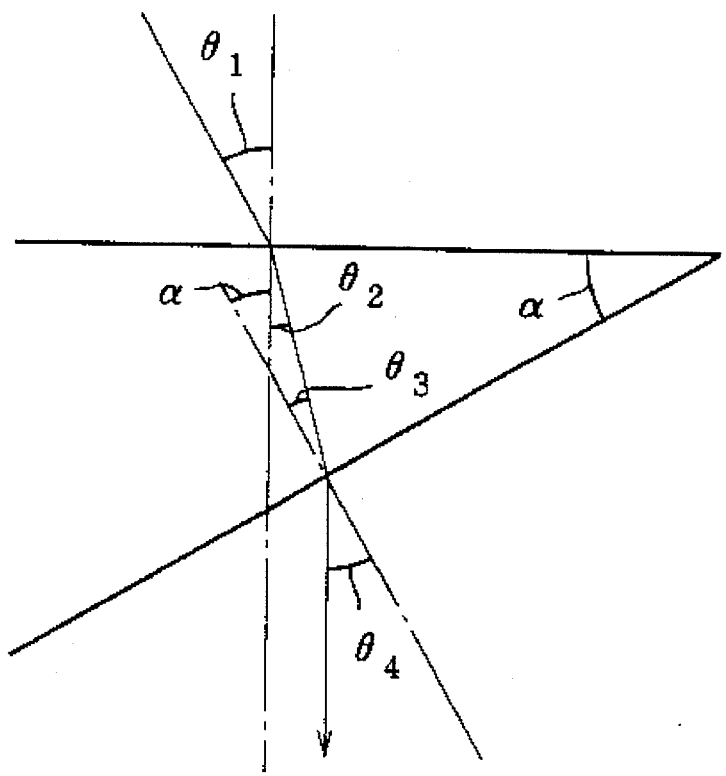
FIG. 14 is a schematic view showing a construction of a prism.
Figure 13A:
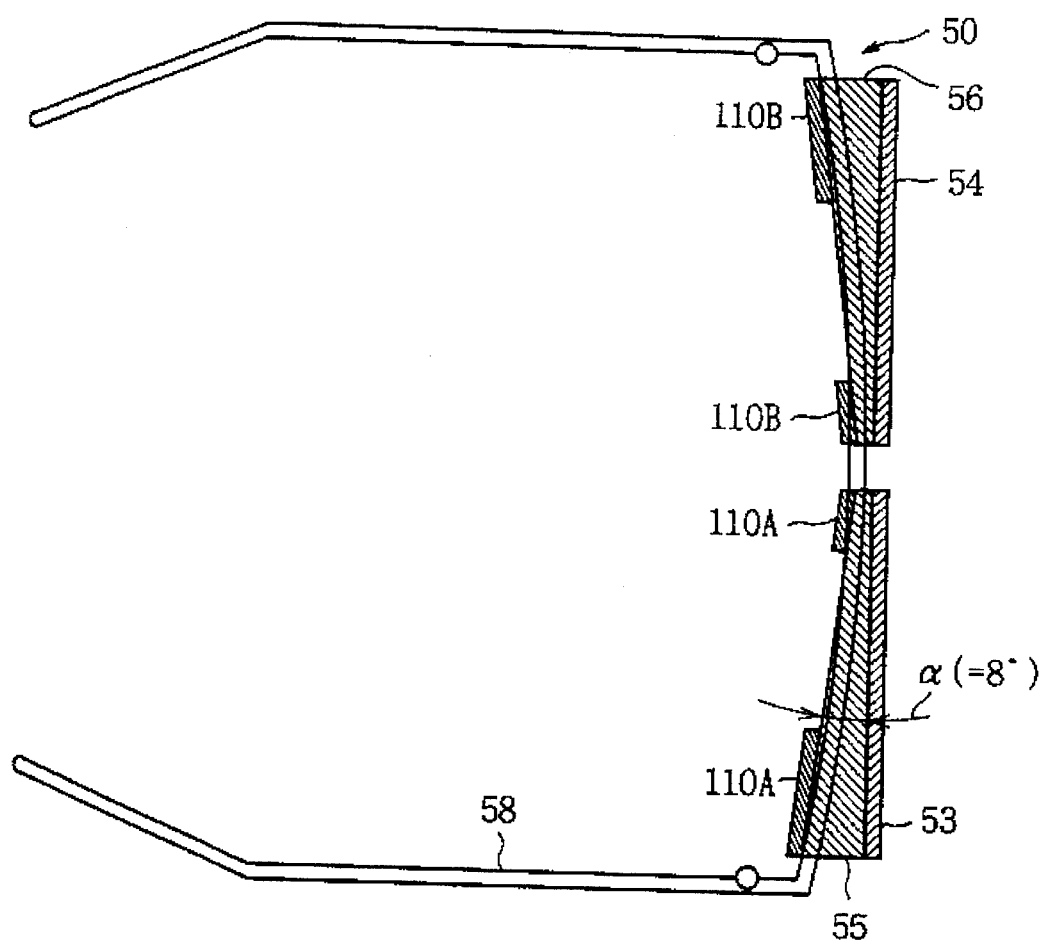
FIGS. 13A and 13B are schematic linear views showing a construction of glasses for viewing stereoscopic images.
Figure 13B:
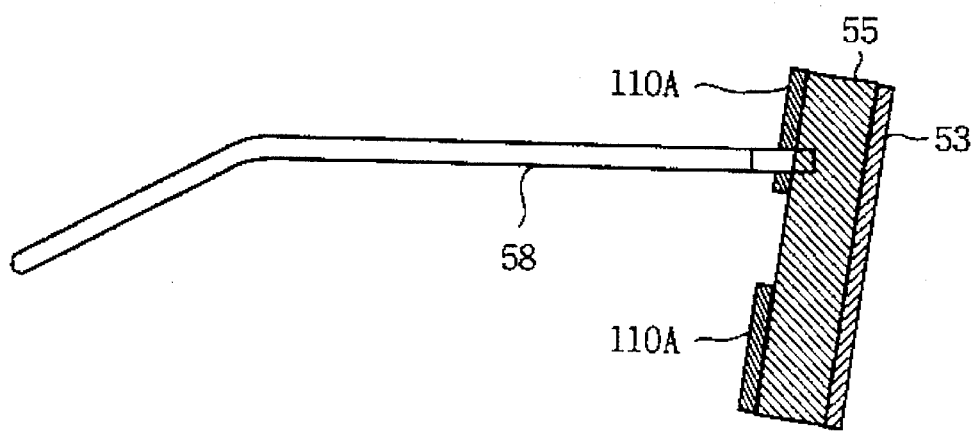

In such a case, as shown in FIGS. 13A and 13B, glasses 50 for viewing stereoscopic images can be used which have the polarizing filters 53 and 54 and the prisms 55 and 56. Here, with respect to the shape of the prisms 53 and 54, as shown in FIG. 14, when the refraction index of the prism is set to "n", the incident angle with respect to the incident surface is set to $\theta_1$, the output angle with respect to the incident surface of the prism is set to $\theta_2$, an inside angle with respect to the output angle of the prism is set to $\theta_3$, the output angle with respect to the output angle of the prism is set to $\theta_4$, and the tip angle of the prism is set to $\alpha$, the refraction index "n" of the prism is represented by the following equation:

$$n = \frac{\sin\theta_1}{\sin\theta_2} \tag{1}$$

$$n = \frac{\sin\theta_4}{\sin\theta_3} \tag{2}$$

whereas the relationship between the output angle $\theta_4$ and the tip angle $\alpha$ is represented by the following formula:

$$\theta_4 = \alpha \tag{3}$$

The relationship between the output angle $\theta_2$, inside angle $\theta_3$, and the tip angle $\alpha$ is represented by the following formula:

$$\theta_3 = \alpha - \theta_2 \tag{4}$$

The refraction index "n" can be represented from equations (1), (2), (3), and (4), by the following equation:

$$n = \frac{\sin\alpha}{\sin\left\{\alpha - \sin^{-1}\left(\frac{\sin\theta_1}{n}\right)\right\}} \tag{5}$$

By modifying equation (5), the following equation is obtained:

$$\frac{\sin\alpha}{n} = \sin\left\{\alpha - \sin^{-1}\left(\frac{\sin\theta_1}{n}\right)\right\} \tag{6}$$

Then, from equation (6), the following equation is obtained:

$$\alpha - \sin^{-1}\left(\frac{\sin\alpha}{n}\right) = \sin^{-1}\left(\frac{\sin\theta_1}{n}\right) \tag{7}$$

Thus, equation (7) is modified to represent the incident angle $\theta_1$, and the following equation is obtained:

$$\theta_1 = \sin^{-1}\left[n \cdot \sin\left\{\alpha - \sin^{-1}\left(\frac{\sin\alpha}{n}\right)\right\}\right] \tag{8}$$

When the incident angle $\theta_1$ is small, the following equation is obtained:

$$\theta_1 \approx n \cdot \left(\alpha - \frac{\alpha}{n}\right) = \alpha(n-1) \tag{9}$$

In this particular embodiment, a polyacrylate is used in the prism. When the refraction index "n" of the polyacrylate is 1.491 and the tip angle $\alpha$ is set to 10°, the incident angle $\theta_1$ becomes about 4.94°.

Figure 15:
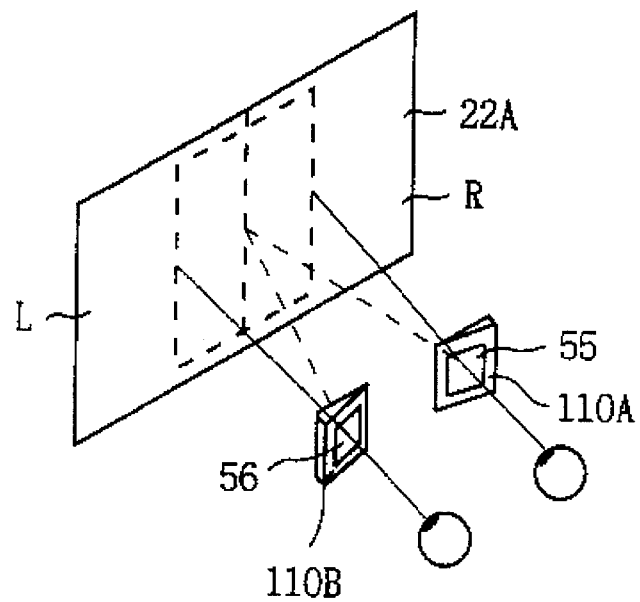
FIG. 15 is a perspective view showing an example of left and right parallel arrangement display and prisms.

(3-5) In the above embodiments, the left and the right screens replace each other on the display screen 22A of the monitor 22 with the result that the right screen R displayed on the left side is watched with the right eye through the polarizing filter 33 and the left screen L displayed on the right side is watched with the left eye through the polarizing filter 34. However, this invention is not limited to this, but, for example, as shown in FIG. 15, the left screen L is displayed on the left side of the display screen 22A and the right screen R is displayed on the right side of the display screen 22A without replacing the right and the left screen R and L with each other. At the same time, the right screen R of the display screen 22A may be observed with the right eye through the prism 55 and the left screen L is observed with the left eye through the prism 56 without using the polarizing filter 23 on the monitor 22 and polarizing filters 53 and 54 of glasses 50 for viewing stereoscopic images.

In such a case, the stereoscopic image can be watched without a sense of discomfort by providing the sight-limitation frames 110A and 110B on the prisms 55 and 56.

Figure 16A:
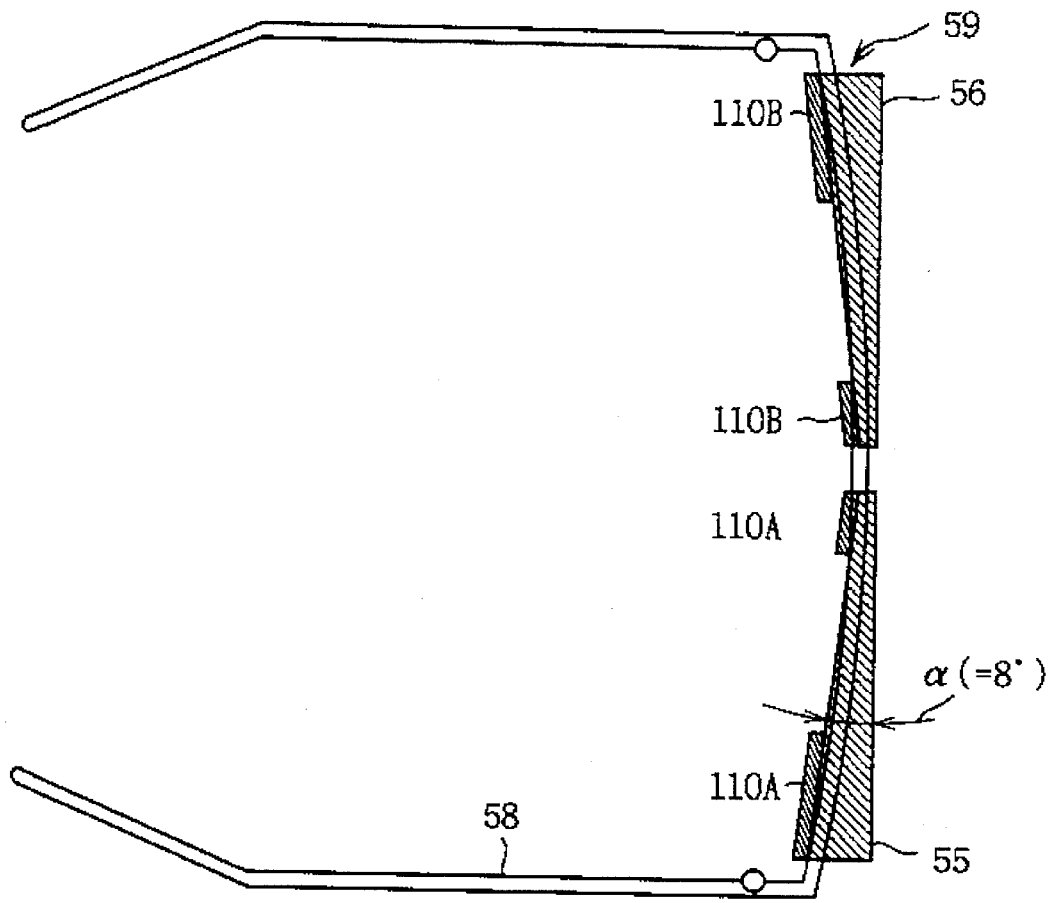
FIGS. 16A and 16B are schematic views showing a construction of glasses for viewing stereoscopic images.
Figure 16B:
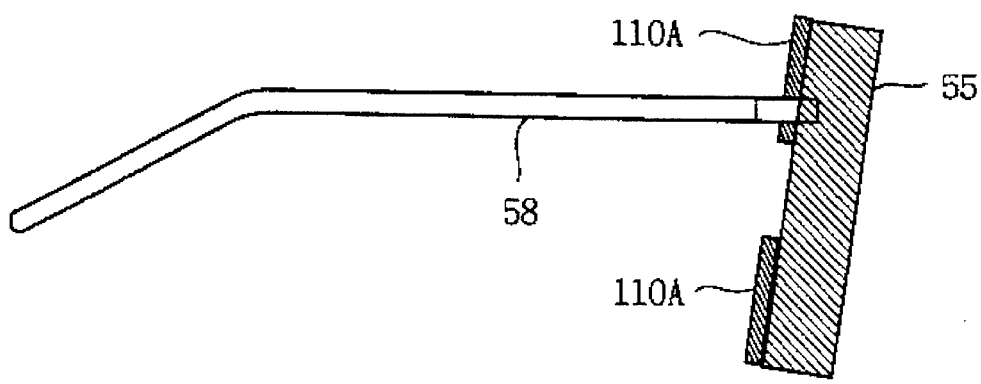

In this case, as shown in FIGS. 16A and 16B, glasses for viewing stereoscopic images can be used which have only prisms 55 and 56 provided with the sight-limitation frames 110A and 110B.

Figure 17:
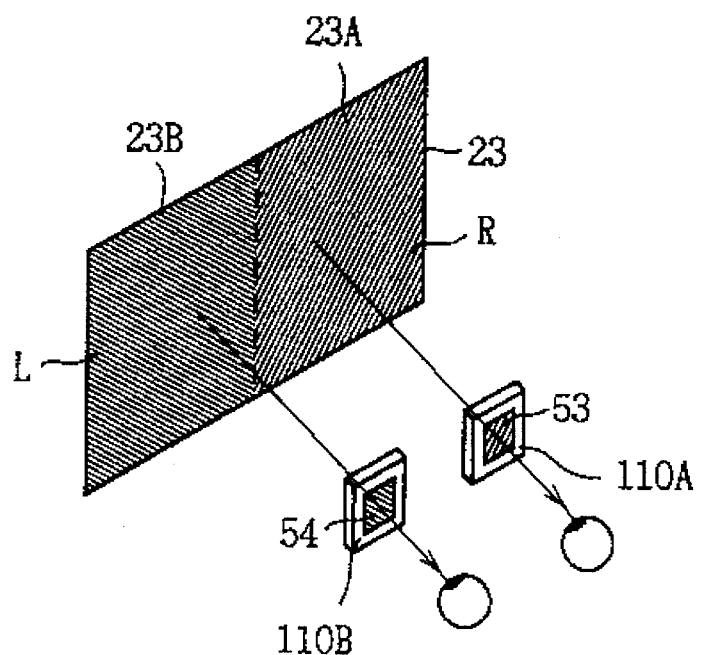
FIG. 17 is a perspective view showing an example of use of left and right parallel arrangement display employing polarizing filters.

(3-6) In the above embodiments, the left and the right screens replace each other on the display screen 22A of the monitor 22 with the result that the right screen R displayed on the left side is watched with the right eye through the polarizing filter 33 and the left screen L displayed on the right side is watched with the left eye through the polarizing filter 34. However, this invention is not limited to this, for example, as shown in FIG. 17, the left screen L is displayed on the left side of the display screen 22A and the right screen R is displayed on the right side of the display screen 22A without having the right and the left screen R and L replace each other. At the same time, the right screen R is observed with the right eye through the polarizing filter 23A and the polarizing filter 53 transparent to light with respect to the polarizing filter 23A provided on the monitor 22 whereas the left screen L may be observed with the left eye through the polarizing filter 23B and the polarizing filter 54 transparent to light with respect to the polarizing filter 23B provided on the monitor 22.

In such a case, the stereoscopic image can be watched without a sense of discomfort by providing the sight-limitation frames 110A and 110B on the prisms 53 and 54.

Figure 18:
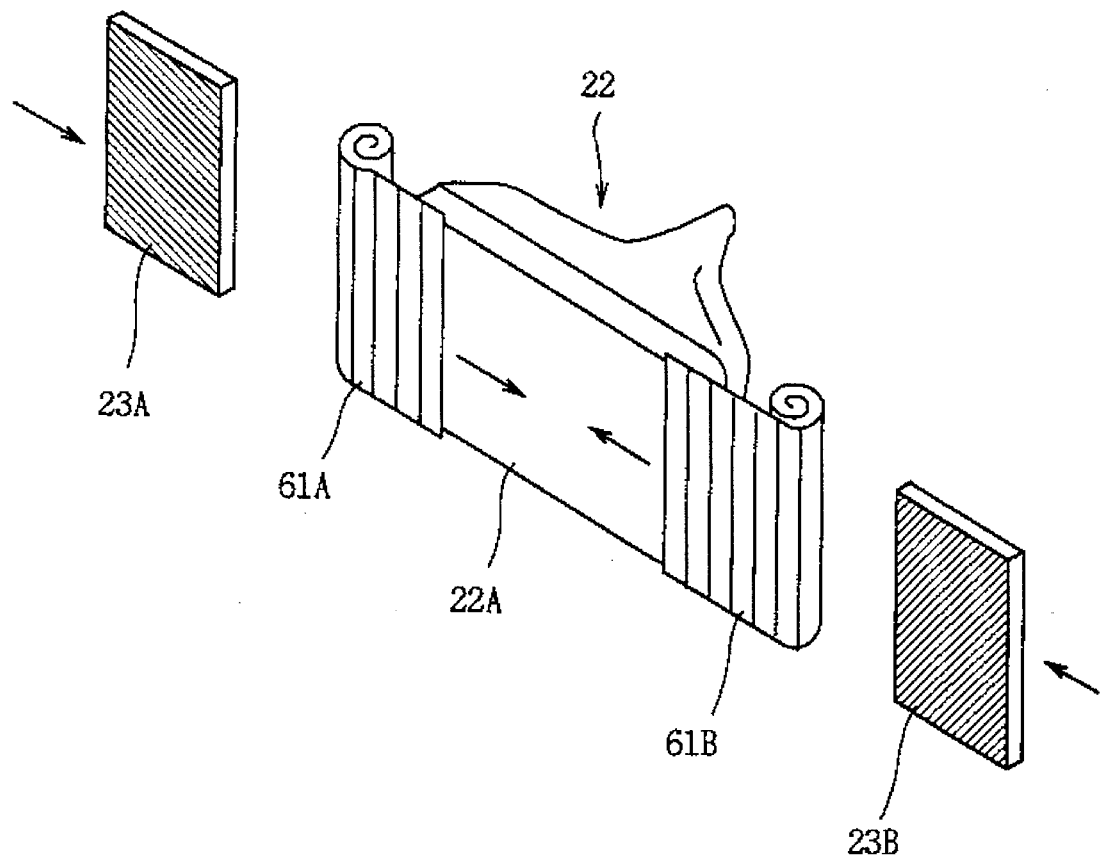
FIG. 18 is a perspective view showing a construction of a polarizing filter and a cinema shutter.

(3-7) In the above embodiments, the polarizing filter 23 is manually provided on the display screen 22A of the monitor 22. However, this invention is not limited to this, for example, as shown in FIG. 18, polarizing filters 23A and 23B may be provided which can be opened and closed with a predetermined drive means (not shown) on the front of the display screen 22A.

Along with the polarizing filters 23A and 23B, so-called cinema shutters 61A and 61B may be provided on the front of the display screen 22A so that the cinema shutters can be opened and closed with the predetermined drive means (not shown) based on the aspect ratio of the television signal (MUSE, NTSC, and the like) displayed on the display screen 22A.

Figure 19:
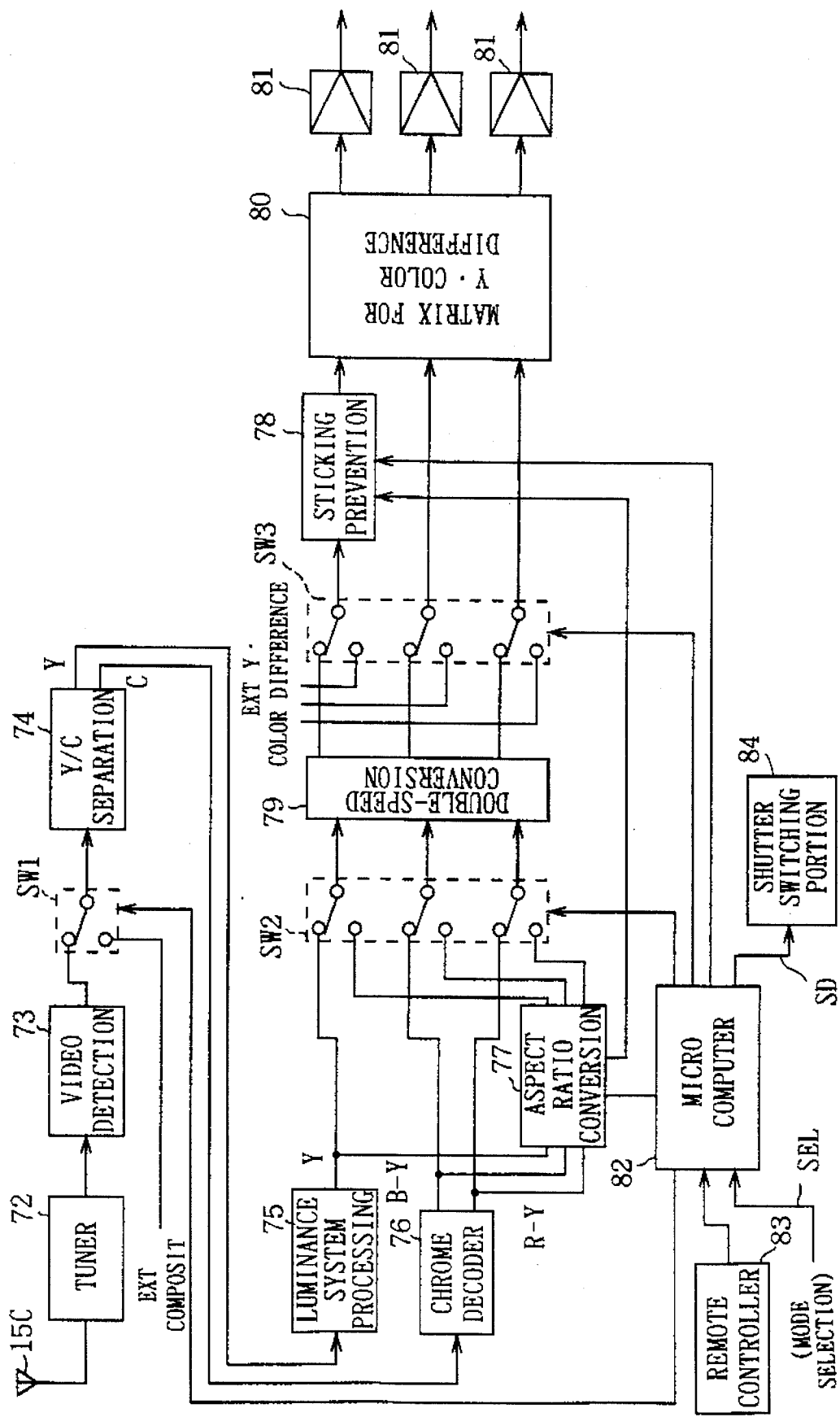
FIG. 19 is a block diagram showing a circuit construction for opening and closing the polarizing filter.

In this case, the polarizing filter 23A and 23B, and cinema shutter 61A and 61B can be driven with an image reception circuit having a structure as shown in FIG. 19. In other words, referring to FIG. 18, the television signal receiving by a tuner 72 through a reception antenna 15C is transmitted to a Y/C separation circuit 74 via a following switching circuit SW1 after a video signal is extracted at a video detection circuit 73.

On the one hand, the Y/C separating circuit 74 transmits luminance components to the luminance processing circuit 75 after separating the luminance components and chroma components. After the luminance processing circuit 75 performs the predetermined demodulation of the luminance components followed by speed conversion by transmitting the luminance components to a double-speed conversion circuit 79 via the switching circuit SW2, then the luminance components are transmitted to the Y color difference matrix 80 via the switching circuit SW3 and the scorch prevention circuit 78.

On the other hand, a chroma decoder 76 demodulates the color difference signal from the chroma components from the Y/C separation circuit 74. Then, the color difference signal is transmitted to the Y color difference matrix 80 via the switching circuit SW 79, the double-speed conversion circuit 79, and the switching circuit SW3. The Y color difference matrix 80 generates a reproduction signal for each of R, G, and B from the demodulated luminance signal and the color difference signal and transmits the signal to the CRT drive circuit (not shown) via the amplification circuit 81, respectively.

Here, the luminance signal and the color difference signal transmitted from the luminance processing circuit 75 and the chroma decoder 76 are temporarily input into the aspect ratio conversion circuit 77 so that the aspect ratio is converted based on the aspect ratio conversion control signal output from the microcomputer 82.

Therefore, the microcomputer 82 converts an aspect ratio displayed based on a mode selection signal SEL (or a mode selection signal input from a predetermined operation panel) included in a signal received via a receiving antenna 15C so that the aspect conversion circuit 77 is controlled based on the mode selection signal SEL. At the same time, shutter opening and closing 84 is controlled based on the aspect ratio of the selected mode. This controls the opening and closing of the cinema shutter 61A and 61B provided on the front of the display screen 22A.

Furthermore, a user can control the opening and closing of the polarizing filters 23A and 23B provided on the front of the display screen 22A by remote control using a remote commander 83. This further facilitates the installation of the polarizing filters 23A and 23B.

(3-8) In the above embodiments, this invention is described with respect to a case in which stereoscopic images are displayed using a monitor 22 comprising a CRT. However, this invention is not limited to this, but as shown in FIG. 20, this invention can be applied to a front-projection projector.

Figure 20:
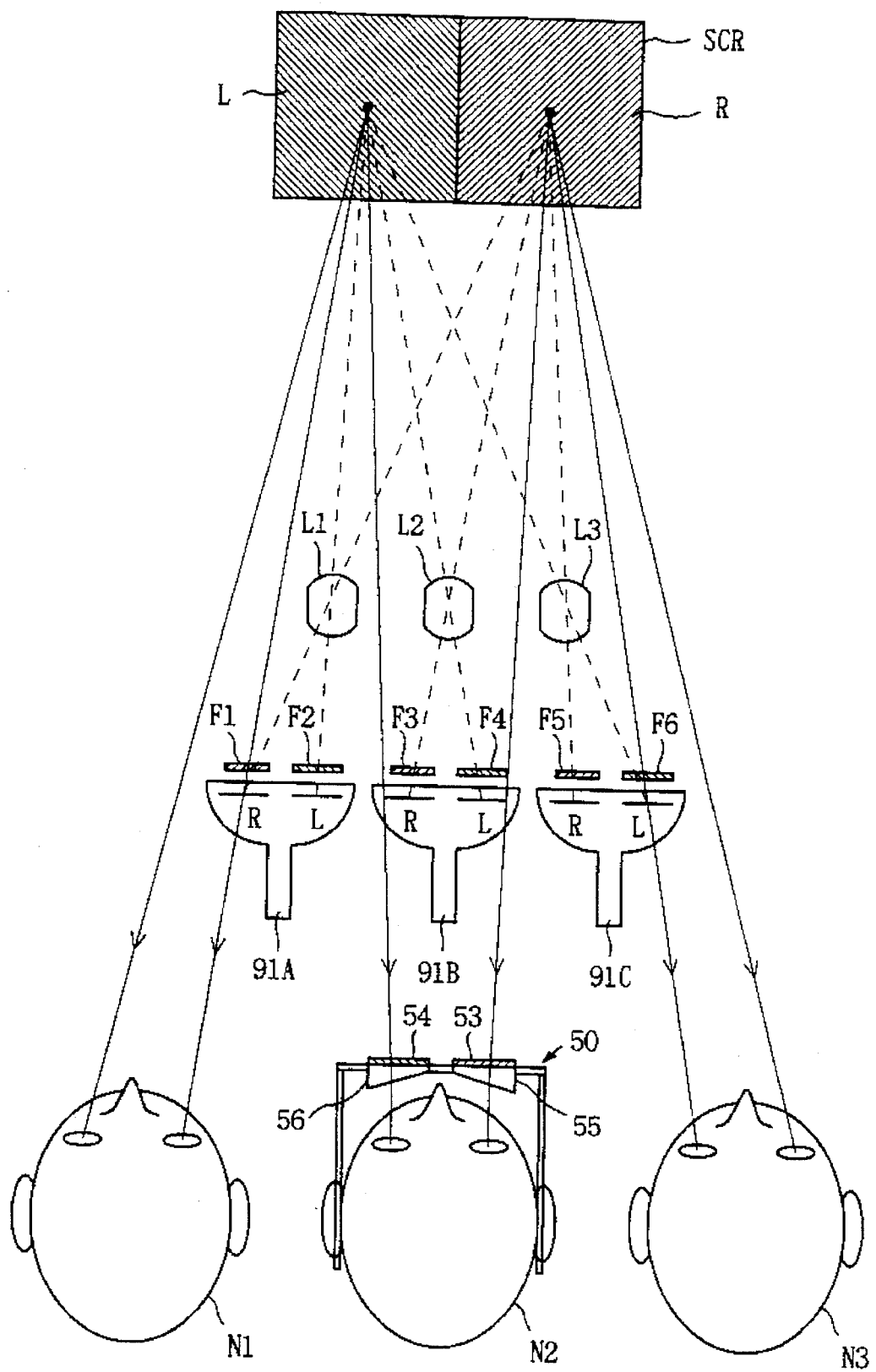
FIG. 20 is a schematic linear view showing a construction of a front projector.

Therefore, referring to FIG. 20, the projector has three cathode ray tubes 91A, 91B, and 91C corresponding to R, G, and B. The cathode ray tubes can display images which are viewed from different points in the horizontal direction. The right screen R irradiated from each cathode ray tube is projected to the right side of the screen SCR, whereas the left screen L is projected to the left side of the screen SCR via lenses L1, L2, and L3.

Here, the image light of the right screen R irradiated from each cathode ray tube 91A, 91B, and 91C is projected on the screen SCR via the polarizing filters F1, F3, and F5. Consequently, on the one hand, the right screen R projected on the screen SCR can be observed with the right eye via the polarizing filter 53 transparent to light with respect to the polarizing filters F1, F3 and F5. On the other hand, the image light of the left screen L projected from each cathode ray tube 91A, 91B, and 91C is projected on the screen SCR via the polarizing filters F2, F4 and F6. Consequently, the left screen L projected on the screen SCR can be observed with the left eye via the polarizing filter 54 transparent to light with respect to the polarizing filters F2, F4, and F6.

In this manner, a front-projection projector can provide stereoscopic images. In such a case, users N1 and N3 who do not use glasses 50 for viewing stereoscopic images, as compared to a user N2 who use glasses 50 for viewing stereoscopic images, can view a natural plane image in place of the conventional double images by directly observing the left screen L and the right screen R of the screen SCR.

In such a case, the stereoscopic image can be observed without a sense of discomfort by providing the sight-limitation frames 110A and 110B on the prisms 55 and 56.

(3-9) In the above embodiment, this invention is described in a case in which the stereoscopic images are displayed using a monitor 22 comprising a CRT. However, this invention is not limited to this, for example, as shown in FIG. 21, can be applied to a rear-projected projector.

Figure 21:
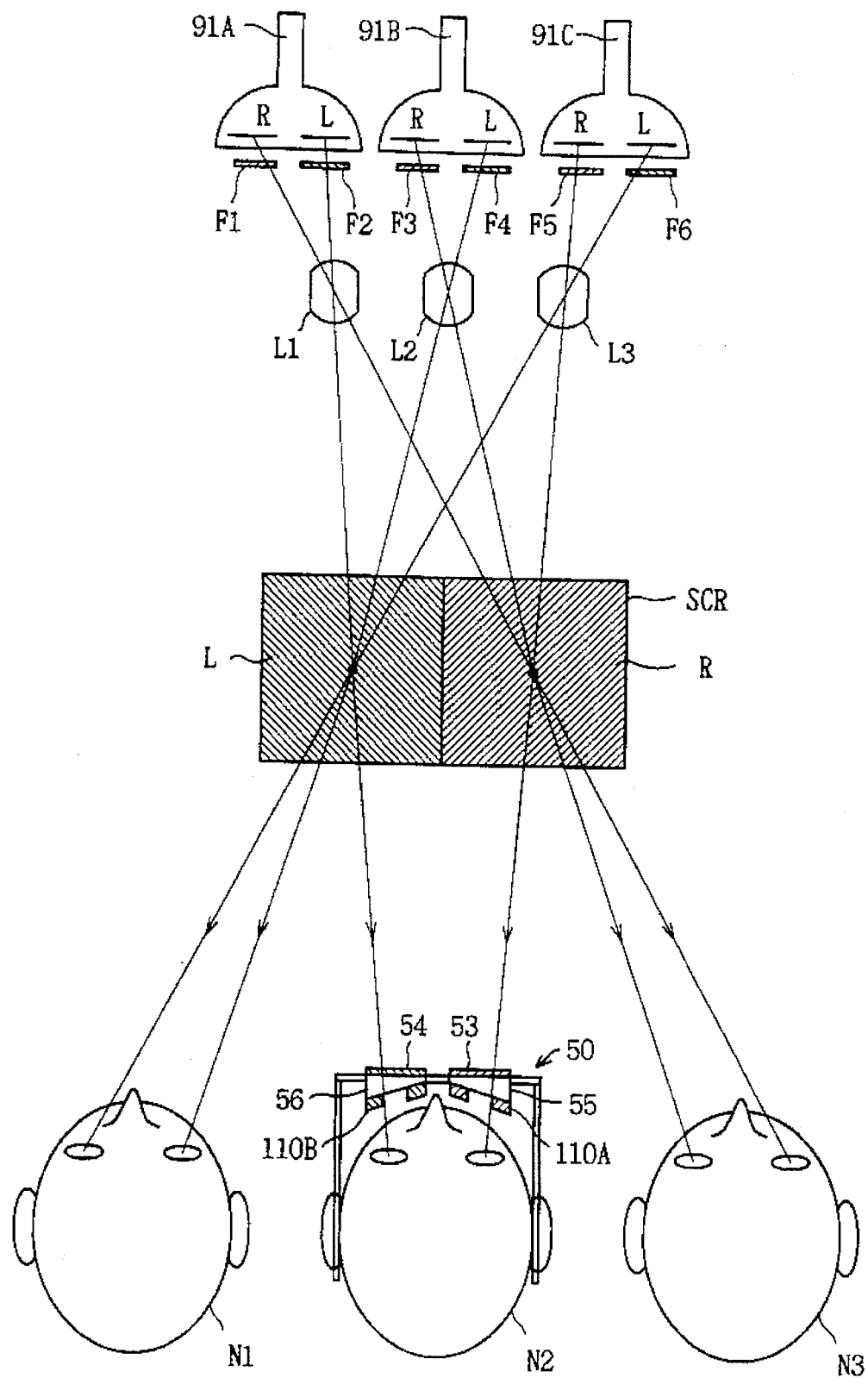
FIG. 21 is a schematic linear view showing a construction of a back projector.

In other words, referring to FIG. 21, the projector has three cathode ray tubes 91A, 91B, and 91C corresponding to R, G, and B so that the cathode ray tubes can display images which are viewed from different viewpoints in the horizontal direction. The right screen R irradiated from each of the cathode ray tubes can be projected onto the right side of the screen SCR via lenses L1, L2, and L3, whereas the left screen L is projected onto the left side of the screen SCR via lenses L1, L2, and L3.

Here, the image light of the right screen R projected from each cathode ray tube 91A, 91B, and 91C is projected on the screen SCR via the polarizing filters F1, F3, and F5. Consequently, on the one hand, the right screen R projected on the screen SCR can be observed with the right eye via the polarizing filter 53 transparent to light with respect to the polarizing filters F1, F3, and F5. On the other hand, the image light of the left screen L irradiated from each cathode ray tube 91A, 91B, and 91C is projected on the screen SCR via the polarizing filters 54 transparent to light with respect to the polarizing filters F2, F4, and F6.

In this manner, a rear-projection projector can provide stereoscopic images. In such a case, users N1 and N3 who do not use glasses 50 for viewing stereoscopic images, as compared to a user N2 who use glasses 50 for viewing stereoscopic images, can view a natural plane image in place of the conventional double images by directly observing the left screen L and the right screen R of the screen SCR.

In such a case, the stereoscopic image can be observed without a sense of discomfort by providing the sight-limitation frames 110A and 110B on the prisms 55 and 56.

(3-10) In the above embodiment, this invention is described in a case in which the stereoscopic images are displayed using a monitor 22 comprising a CRT. However, this invention is not limited to this, for example, as shown in FIG. 22, can be applied to a liquid crystal display.

Figure 22:
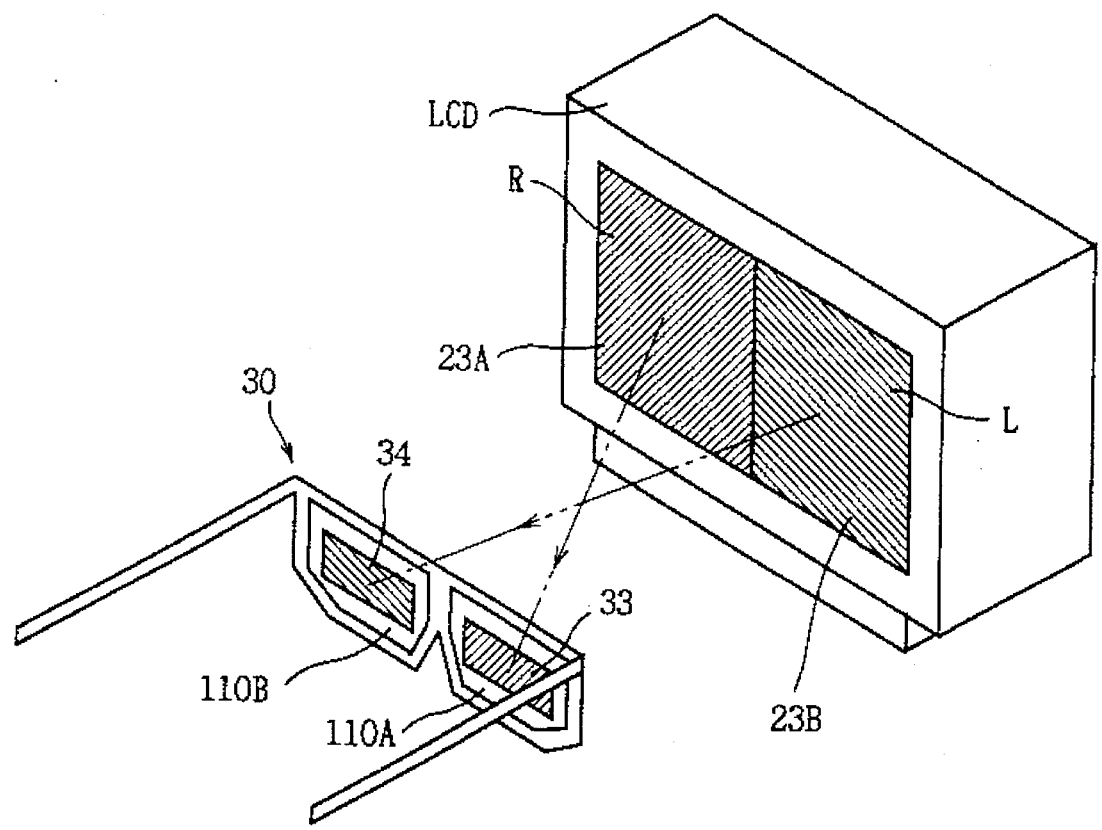
FIG. 22 is a perspective view showing an example of the application of a liquid crystal display.

In other words, referring to FIG. 22, the liquid crystal display LCD has polarizing filters 23A and 23B mutually non-transparent to light to each other in two regions divided in the horizontal direction on the front of the display screen so that the right screen R obtained via the polarizing filter 23A can be observed with the right eye via the polarizing filter 33 transparent to light with respect to the polarizing filter 23A, whereas the left screen L obtained via the polarizing filter 23B is observed with the left eye via the polarizing filter 34 transparent to light with respect to the polarizing filter 23B, thereby providing stereoscopic images.

In such a case, the stereoscopic image can be observed without a sense of discomfort by providing the sight-limitation frames 110A and 110B on the polarizing filters 33 and 34.

(3-11) In the above embodiment, this invention is described in a case in which the high-definition television signal is transmitted by using a broadcasting satellite 15B. However, the transmission medium is not limited to this, for example, as shown in FIG. 23, this invention can be applied to a case in which the high-definition television signal is recorded and reproduced by using an optical disc device.

Figure 23:
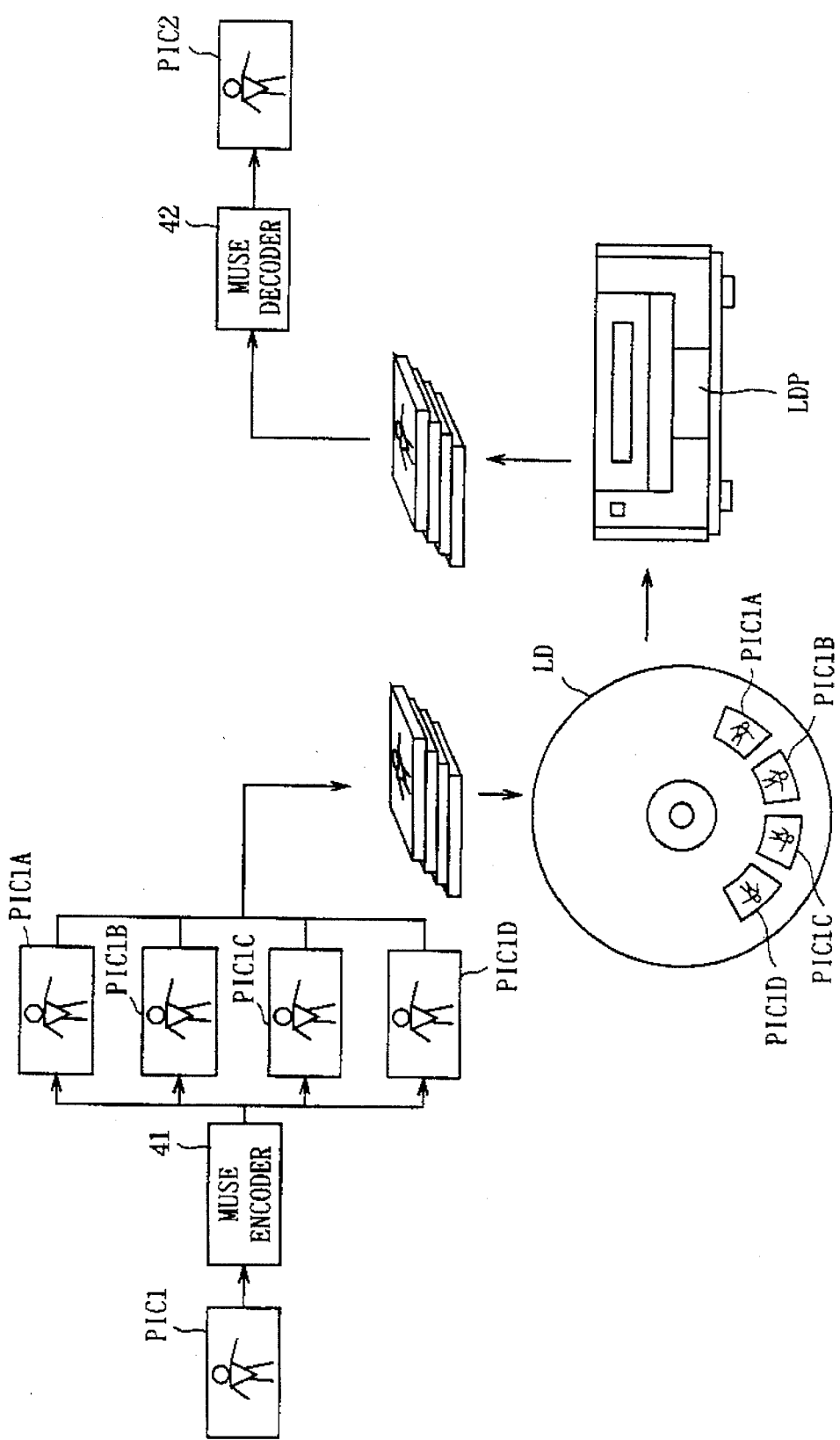
FIG. 23 is a schematic linear view showing an example of the application of a optical disc device.

In other words, referring to FIG. 23, the data of the high-definition television signal obtained by the stereoscopic image camera 11 is thinned out and processed with a MUSE decoder 41 so that one screen (one frame) of data PIC1 is divided into four parts (PIC1A, PIC1B, PIC1C, and PIC1D), with the result that the data is recorded on an optical disc which records such data with a laser.

When the optical disc LD is reproduced on an optical disc device LDP, the four divided images of data PIC1A to PIC1D are reproduced via a MUSE decoder 42 provided on the optical disc device LDP as an accessory, thereby is provided a reproduced image PIC2.

(3-12) In the above embodiment, this invention is described in a case in which the high-definition television signal is transmitted by using a broadcasting satellite 15B. However, the transmission medium is not limited to this, for example, as shown in FIG. 24, this invention can be applied to a case in which the high-definition television signal is recorded and reproduced by using a high-definition video tape recorder.

Figure 24:
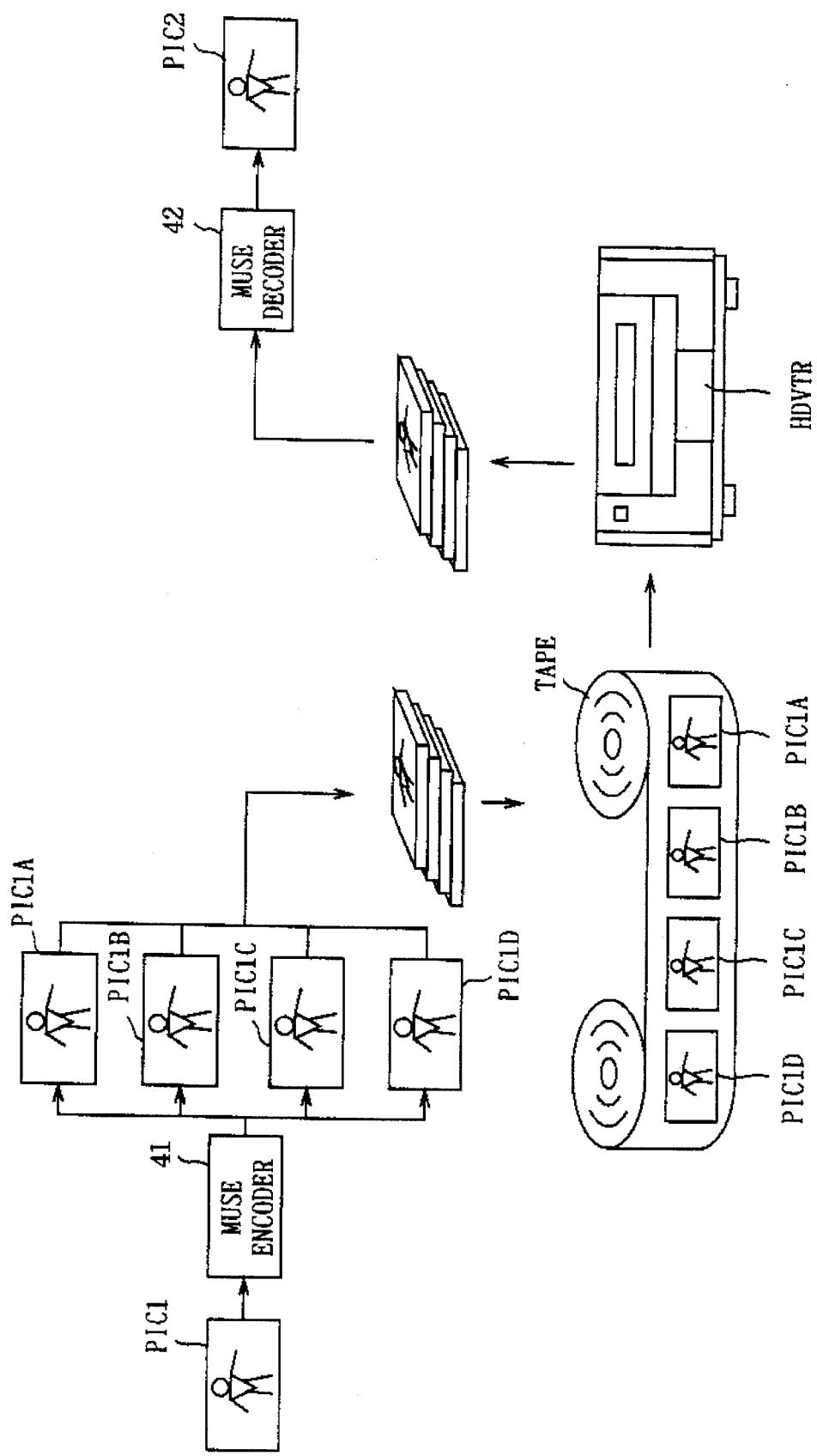
FIG. 24 is a schematic linear view showing an example of the application of a high-definition video cassette recorder (VCR).

In other words, referring to FIG. 24, the data of the high-definition television signal obtained by the stereoscopic image camera 11 is thinned out and processed with a MUSE decoder 41 so that one screen (one frame) of data PIC1 is divided into four parts (PIC1A, PIC1B, PIC1C, and PIC1D), with the result that the data is recorded on a magnetic tape TAPE.

When the magnetic tape TAPE is reproduced with the high-definition video tape recorder HDVTR, the four divided images of data PIC1A to PIC1D are reproduced via a MUSE decoder provided on the high-definition video tape recorder HDVTR 42 as an accessory, thereby providing a reproduction image PIC2.

(3-13) In the above embodiments, a case is described in which polarizing filters are used which have polarizing plans mutually orthogonal to each other. However, this invention is not limited to this, but a circular polarizing filter having rotation directions mutually different from each other may be used.

While the invention has been described in connection with the preferred embodiments of the invention, it will be obvious to those skilled in the art that various changes and modifications may be devised, therefore, it is intended to cover in the appended claims all such changes and modifications as fall within the true spirit and scope of the invention.

What is claimed is:

1. A stereoscopic image display for displaying a stereoscopic image to a viewer by displaying on a display screen two images which are viewed from different points, said display comprising:

display means for displaying a left image to be observed with a left eye of the viewer on the right half of the display screen having an aspect ratio larger than a standard television set, and a right image to be observed with a right eye of the viewer on the left half of the display screen;

optical overlapping means for overlapping in the center of the display screen, the left image and the right image so that the left image and the right image reach the left and right eyes, respectively; and means for mechanically limiting a directional passage of light so that only the left image reaches the left eye of the viewer and only the right image reaches the right eye of the viewer.

2. A stereoscopic image display according to claim 1, comprising:

a pair of screen polarizing filters arranged on said left half and said right half of the display screen, said pair of screen polarizing filters having polarizing properties which render said pair of screen polarizing filters non-transparent to light; and a pair of optical overlapping polarizing filters arranged on said optical overlapping means, wherein said pair of optical overlapping polarizing filters have polarizing properties corresponding to said pair of screen polarizing filters.

3. A stereoscopic image display for displaying a stereoscopic image to a person by displaying on a display screen two images which are viewed from different points, said display comprising:

display means for displaying a left image to be observed with a left eye of the person on the left half of the display screen having an aspect ratio larger than a standard television set, and a right image to be observed with a right eye of the person on the right half of the display screen;

a pair of screen polarizing filters arranged on said left half and said right half of said display screen, wherein said pair of screen polarizing filters have polarizing properties which render said pair of screen polarizing filters non-transparent to light;

a pair of eye polarizing filters arranged before the left and right eyes of the person who watches said display screen, wherein said pair of eye polarizing filters have polarizing properties corresponding to said pair of screen polarizing filters; and means for mechanically limiting a directional passage of light so that only the left image reaches the left eye of the viewer and only the right image reaches the right eye of the viewer.

4. A stereoscopic image display for displaying a stereoscopic image to a viewer by displaying on a display screen two images which are viewed from different points, said display comprising:

display means for displaying, by reversing time relationships between a right image to be observed with a right eye of the viewer and a left image to be observed with a left eye of the viewer, said right image on said left half of said display screen having an aspect ratio larger than a standard television set, and said left image on said right half of said display screen;

optical overlapping means arranged before the left and right eyes of the viewer who watches said display screen, said optical overlapping means overlapping in the center of said display screen, said right image on said left half of said display screen and said left image on said right half of said display screen so that the left image and the right image reach the left and right eyes, respectively; and means for mechanically limiting a directional passage of light so that only the left image reaches the left eye of the viewer and only the right image reaches the right eye of the viewer.

5. The stereoscopic image display according to claim 4, further comprising:

a pair of screen polarizing filters arranged on said left half and said right half of said display screen, wherein said pair of screen polarizing filters have polarizing properties which render said pair of screen polarizing filters non-transparent to light; and a pair of optical overlapping polarizing filters arranged on said optical overlapping means, wherein said pair of optical overlapping polarizing filters have polarizing properties corresponding to said pair of screen polarizing filters.

6. The stereoscopic image display according to claim 4, further comprising:

a pair of screen polarizing filters arranged on said left half and said right half of said display screen, wherein said pair of screen polarizing filters have polarizing properties which render said pair of screen polarizing filters non-transparent to light; and a pair of eye polarizing filters arranged before the left and right eyes of the viewer who watches said display screen, wherein said pair of eye polarizing filters have polarizing properties corresponding to said pair of screen polarizing filters.

7. A pair of glasses for use with a stereoscopic image display for displaying to a person a stereoscopic image by dividing a display screen into two regions to display respectively a first image and a second image which are viewed from different respective points, said pair of glasses comprising:

a first sight-limitation frame for mechanically limiting a directional passage of light so that only said first image on one of said two regions reaches a first eye of the person viewing the display screen; and a second sight-limitation frame for mechanically limiting a directional passage of light so that only said second image on another of said two regions reaches a second eye of the person viewing the display screen.

* * * * *